(12) United States Patent
Narutomi et al.

(10) Patent No.: US 11,824,197 B2
(45) Date of Patent: *Nov. 21, 2023

(54) POSITIVE ELECTRODE COMPOSITION

(71) Applicant: DENKA COMPANY LIMITED, Tokyo (JP)

(72) Inventors: Takuya Narutomi, Tokyo (JP); Jun Watanabe, Tokyo (JP); Shigeru Suzuki, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 681 days.

This patent is subject to a terminal disclaimer.

(21) Appl. No.: 16/621,567

(22) PCT Filed: Jun. 13, 2018

(86) PCT No.: PCT/JP2018/022554
§ 371 (c)(1),
(2) Date: Dec. 11, 2019

(87) PCT Pub. No.: WO2018/230597
PCT Pub. Date: Dec. 20, 2018

(65) Prior Publication Data
US 2021/0151763 A1 May 20, 2021

(30) Foreign Application Priority Data
Jun. 13, 2017 (JP) ................. 2017-115967

(51) Int. Cl.
H01M 4/62 (2006.01)
H01M 10/0525 (2010.01)
C08L 27/16 (2006.01)
C08L 51/00 (2006.01)
H01M 4/505 (2010.01)
H01M 4/525 (2010.01)
H01M 4/02 (2006.01)

(52) U.S. Cl.
CPC ............ H01M 4/623 (2013.01); C08L 27/16 (2013.01); C08L 51/003 (2013.01); H01M 4/505 (2013.01); H01M 4/525 (2013.01); H01M 10/0525 (2013.01); H01M 2004/028 (2013.01)

(58) Field of Classification Search
CPC combination set(s) only.
See application file for complete search history.

(56) References Cited

U.S. PATENT DOCUMENTS

| 5,415,958 | A | 5/1995 | Takahashi et al. | 429/217 |
|---|---|---|---|---|
| 9,941,518 | B2 * | 4/2018 | Sakurai | H01M 4/505 |
| 10,522,835 | B2 * | 12/2019 | Narutomi | H01M 4/525 |
| 11,028,209 | B2 * | 6/2021 | Nagai | H01M 10/0525 |
| 2002/0034686 | A1 * | 3/2002 | Yamakawa | H01M 4/621 |
| | | | | 429/231.95 |
| 2011/0020709 | A1 * | 1/2011 | Fukumine | C08J 5/18 |
| | | | | 429/246 |
| 2014/0023935 | A1 | 1/2014 | Noguchi et al. | 429/333 |
| 2014/0038048 | A1 | 2/2014 | Chung et al. | 429/217 |
| 2015/0050555 | A1 | 2/2015 | Fukumine et al. | 429/217 |
| 2016/0240854 | A1 | 8/2016 | Sakurai et al. | 4/622 |
| 2016/0380314 | A1 | 12/2016 | Yang et al. | H01M 10/4235 |
| 2017/0288218 | A1 | 10/2017 | Horikoshi et al. | 4/405 |
| 2018/0358624 | A1 | 12/2018 | Narutomi et al. | |
| 2019/0027756 | A1 * | 1/2019 | Narutomi | C08K 7/06 |
| 2019/0248944 | A1 | 8/2019 | Nagai et al. | 261/4 |

FOREIGN PATENT DOCUMENTS

| CN | 103493276 A | 1/2014 |
|---|---|---|
| CN | 104119480 A | 10/2014 |
| CN | 106299244 A | 1/2017 |
| JP | H 06-172452 A | 6/1994 |
| JP | 2004-134208 A | 4/2004 |
| JP | 2012-59466 A | 3/2012 |
| JP | 2013-84351 A | 5/2013 |
| JP | 2013-98123 A | 5/2013 |
| JP | 2015-125964 A | 7/2015 |

(Continued)

OTHER PUBLICATIONS

International Search Report dated Jul. 17, 2018, issued to International Application No. PCT/JP2018/022554.
Chinese Office Action dated Mar. 2, 2022, issued to Chinese Application No. 201880038628.7.
Chinese Office Action dated Jul. 18, 2022, issued to Chinese Application No. 201880038628.7.
Development and Production of Commercial Fine Chemical Products, Iai xing Ii and Xiaoxi Science and Technology Research Press, Oct. 31, 2006, related pp. 276-277.
Extended European Search Report dated Jun. 28, 2019, issued by the European Patent Office in corresponding application EP 17834081.6.

(Continued)

Primary Examiner — Anca Eoff
(74) Attorney, Agent, or Firm — Stein IP, LLC

(57) ABSTRACT

An object of the present invention is to provide a composition for a positive electrode having high binding properties and high flexibility. A composition for a positive electrode, comprising: a graft copolymer-based resin; a polyvinylidene fluoride-based resin, wherein the graft copolymer-based resin includes a graft copolymer in which a monomer, having (meth)acrylonitrile as a main component, is graft-copolymerized with a polyvinyl alcohol. The graft copolymer-based resin optionally further includes at least one of a (meth)acrylonitrile-based non-graft polymer and a polyvinyl alcohol homopolymer. And, a slurry for a positive electrode comprising the composition. A positive electrode comprising a metal foil and a coating film of the slurry. The composition preferably has a mass ratio of the graft copolymer-based resin and the polyvinylidene fluoride resin, which is: graft copolymer-based resin/polyvinylidene fluoride-based resin=2/8 to 8/2.

11 Claims, No Drawings

(56) References Cited

FOREIGN PATENT DOCUMENTS

| WO | WO 2012/014616 A1 | 2/2012 |
| --- | --- | --- |
| WO | WO 2015/053224 A1 | 4/2015 |
| WO | WO 2016/024525 A1 | 2/2016 |
| WO | WO2017/10178 * | 6/2017 |
| WO | WO 2018/021073 A1 | 2/2018 |
| WO | WO 2018/230597 A1 | 12/2018 |

OTHER PUBLICATIONS

Chinese Decision of Rejection dated Jan. 10, 2023, issued by the State Intellectual Property Office of People's Republic of China in corresponding application CN 201880038628.7.

"Plastics Properties Application Handbook (Revised Edition)", pp. 303-304.

* cited by examiner

POSITIVE ELECTRODE COMPOSITION

CROSS-REFERENCE TO RELATED APPLICATIONS

This application is a national stage of International Application No. PCT/JP2018/022554, filed Jun. 13, 2018, which claims the benefit of Japanese Application No. 2017-115967, filed Jun. 13, 2017, in the Japanese Patent Office, the disclosures of which are incorporated herein by reference.

TECHNICAL FIELD

The present invention relates to a composition for a positive electrode, for example, a binder composition for a positive electrode.

BACKGROUND

In recent years, a secondary battery has been used as a power source for electronic devices such as notebook computers, mobile phones. Moreover, development of hybrid vehicles and electric vehicle using the secondary battery is promoted to reduce the environmental load. Secondary batteries having high energy density, high voltage, and high durability are required for their power sources. Lithium ion secondary batteries are attracting attention as secondary batteries that can achieve high voltage and high energy density.

A lithium ion secondary battery is composed of a positive electrode, a negative electrode, an electrolyte, and a separator. The positive electrode is composed of a positive electrode active material, a conductive auxiliary agent, a metal foil, and a binder (Patent Literatures 1 to 3).

As a binder for positive electrode for a lithium ion secondary battery, a binder (graft copolymer), having high binding properties and oxidation resistance, mainly composed of polyvinyl alcohol and polyacrylonitrile is disclosed (Patent Literature 4).

However, Patent Literatures 1 to 4 do not disclose the use of polyvinylidene fluoride (hereinafter also referred to as PVDF) as the binder composition for positive electrode.

A conductive composition for electrodes is disclosed, which contains carbon nanofibers having a median diameter D50 value in terms of volume of 0.1 to 8 μm, an active material, and a binder (Patent Literature 5).

However, Patent Literature 5 does not mention the graft copolymer.

CITATION LIST

Patent Literature

Patent Literature 1: JP2013-98123
Patent Literature 2: JP2013-84351
Patent Literature 3: JPH6-172452
Patent Literature 4: WO2015/053224
Patent Literature 5: WO2016/024525

SUMMARY OF INVENTION

Technical Problem

The present invention has been made by taking the afore-mentioned circumstances into consideration, an object of the present invention is to provide a composition for a positive electrode having high binding properties and high flexibility.

Solution to Problem

The present inventors have achieved providing a composition for a positive electrode having high binding property and high flexibility.

Accordingly, the present invention provides the followings.

(1) A composition for a positive electrode comprising: a graft copolymer-based resin; a polyvinylidene fluoride-based resin, wherein the graft copolymer-based resin includes a graft copolymer in which a monomer, having a (meth)acrylonitle as a main component, is graft-copolymerized with a polyvinyl alcohol.

(2) The composition of (1), wherein the composition has a mass ratio of the graft copolymer-based resin and the polyvinylidene fluoride resin, which is: graft copolymer-based resin/polyvinylidene fluoride-based resin=2/8 to 8/2.

(3) The composition of (1) or (2), wherein the graft copolymer-based resin optionally further includes at least one of a (meth)acrylonitrile-based non-graft polymer and a polyvinyl alcohol homopolymer, a graft ratio of the graft copolymer is 150 to 900%, the (meth)acrylonitrile-based non-grafted polymer has a weight average molecular weight of 30,000 to 300,000, an average polymerization degree of the polyvinyl alcohol is 300 to 3,000, the polyvinyl alcohol has a saponification degree of 85 to 100 mol %, a content of the polyvinyl alcohol in the graft copolymer-based resin is 10 to 40% by mass, and a content of the (meth)acrylonitrile-based polymer in the graft copolymer-based resin is 60 to 90% by mass.

(4) A slurry for a positive electrode comprising the composition of any one of (1) to (3) and a conductive auxiliary agent.

(5) A slurry for a positive electrode comprising the composition of any one of (1) to (3), a positive electrode active material and a conductive auxiliary agent.

(6) The slurry of (5), wherein the positive electrode active material is at least one selected from the group consisting of: $LiNi_XMn_{(2-X)}O_4$ (0<X<2); $Li(Co_XNi_YMn_Z)O_2$ (0<X<1, 0<Y<1, 0<Z<1, and X+Y+Z=1); and $Li(Ni_XCo_YAl_Z)O_2$ (0<X<1, 0<Y<1, 0<Z<1, and X+Y+Z=1).

(7) The slurry of any one of (4) to (6), wherein the conductive auxiliary agent is at least one selected from the group consisting of (i) fibrous carbon, (ii) carbon black, and (iii) a carbon composite in which fibrous carbon and carbon black are interconnected.

(8) The slurry of any one of (5) to (7), wherein a content of the positive electrode active material is 40 to 99.5% by mass in a solid content of the slurry.

(9) A positive electrode comprising a metal foil and a coating film of the slurry of any one of (4) to (8) formed on the metal foil.

(10) A lithium ion secondary battery comprising the positive electrode of (9).

(11) A method for manufacturing the composition of (1) to (3), wherein the graft copolymer is produced by graft copolymerizing a (meth)acrylonitrile with the polyvinyl alcohol.

Advantageous Effects of Invention

According to the present invention, a composition for a positive electrode having high binding property and high flexibility can be provided.

DESCRIPTION OF EMBODIMENTS

Hereinafter, embodiments for carrying out the present invention will be described in detail. The present invention is not limited to the embodiments described below.

The composition for positive electrode according to this embodiment is suitable as a binder composition for a positive electrode (hereinafter sometimes referred to as a binder composition).

[Composition for Positive Electrode]

A composition for a positive electrode according to an embodiment of the present invention is a composition for a positive electrode containing: a graft copolymer-based resin; a polyvinylidene fluoride-based resin, wherein the graft copolymer-based resin includes a graft copolymer in which a monomer, having (meth)acrylonitrile as a main component, is graft-copolymerized with a polyvinyl alcohol.

[Graft Copolymer-Based Resin]

The graft copolymer-based resin contained in the composition for a positive electrode according to an embodiment as one of the binders includes a graft copolymer in which a monomer, having a (meth)acrylonitrile as a main component, is graft-copolymerized with a polyvinyl alcohol (hereinafter, it may be abbreviated as PVA). The graft copolymer is a copolymer in which a side chain of the (meth)acrylonitrile-based polymer is formed on the main chain of the polyvinyl alcohol. In the graft copolymer-based resin, in addition to the graft copolymer, a independent (meth)acrylonitrile-based polymer (hereafter, it may be referred to as "(meth)acrylonitrile-based non-grafted polymer") and/or a PVA homopolymer (hereinafter, it may be referred to as "polyvinyl alcohol homopolymer" or "polyvinyl alcohol non-grafted polymer") that is not involved in the graft copolymerization may be included. Therefore, the graft copolymer-based resin of this embodiment may contain the independent (meth)acrylonitrile-based polymer and/or the PVA homopolymer as a resin component (polymer component) In addition to the graft copolymer. That is, the graft copolymer-based resin may contain other products other than the graft copolymer by copolymerization.

The monomer used for graft copolymerization with PVA includes a (meth)acrylonitrile as an essential component from the viewpoint of oxidation resistance. In addition to the (meth)acrylonitrile, the monomer used for graft copolymerization with PVA may include a monomer which can be copolymerized with the (meth)acrylonitrile as long as the oxidation resistance of the positive electrode composition is not impaired. When a monomer other than the (meth) acrylonitrile is used as a monomer for graft copolymerization, the graft copolymer-based resin may contain a copolymer of the monomer and the (meth)acrylonitrile as another product. Moreover, the monomer used for graft copolymerization with PVA includes the (meth)acrylonitrile as a main component as described above. Here, the "main component" means that 50% by mass or more, preferably 90% by mass or more, of (meth)acrylonitrile is included with respect to the total amount of monomers used for copolymerization, and it is more preferable that the monomer used for copolymerization consist only of the (meth)acrylonitrile (100% by mass). That is, the (meth)acrylonitrile-based polymer (or the (meth)acrylonitrile-based non-graft polymer) is preferably a poly (meth)acrylonitrile (hereinafter, it may be abbreviated as "PAN") composed only of the (meth)acrylonitrile.

The (meth)acrylonitrile in the graft copolymer-based resin is a main component of the monomer units constituting the polymer chain other than the PVA skeleton in the polymer contained in the graft copolymer-based resin. Here, the "main component" means that 50% by mass or more, preferably 90% by mass or more, of the monomer units constituting the polymer chain other than the PVA skeleton in the polymer contained in the graft copolymer-based resin is (meth)acrylonitile. When 90% by mass or more of the monomer units is the (meth)acrylonitrile, the oxidation resistance of the composition for a positive electrode is improved. The upper limit of the proportion of the (meth) acrylonitrile in the monomer units may be 100% by mass or less, and the proportion of the (meth)acrylonitrile is more preferably 100% by mass. The proportion of the monomer units constituting the polymer chain other than the PVA skeleton in the polymer contained in the graft copolymer-based resin can be determined by H-NMR (proton nuclear magnetic resonance spectroscopy).

The saponification degree of PVA is preferably 85 to 100 mol % from the viewpoint of oxidation resistance, and more preferably 95 mol % or more from the viewpoint of enhancing the covering property to the active material. Here, the saponification degree of PVA is a value measured by a method according to JIS K 6726.

The average polymerization degree of PVA is preferably 300 to 3000 from the viewpoints of solubility, binding properties and viscosity of the positive electrode composition solution. The average polymerization degree of PVA is more preferably 320 to 2950, even more preferably 330 to 2500, and even more preferably 500 to 1800. When the average polymerization degree of PVA is 300 or more, the binding property between the binder and the active material, and the binder and the conductive auxiliary agent is improved, so that the durability is improved. When the average polymerization degree of PVA is 3000 or less, the solubility is improved and the viscosity is lowered, so that the production of a slurry for positive electrode is easy. Here, the average polymerization degree of PVA is a value measured by a method according to JIS K 6726.

The graft ratio of the graft copolymer is preferably 150 to 900%, more preferably 300 to 570%. When the graft ratio is 150% or more, the oxidation resistance is improved. When the graft ratio is 900% or less, the binding property is improved.

In producing the graft copolymer (the graft copolymerization), a independent (meth)acrylonitrile-based polymer which is not bonded to the graft copolymer may be produced. Accordingly, a step of separating the graft copolymer and the independent (meth)acryonitrile-based polymer from the graft copolymerization product is required to calculate the graft ratio of the graft copolymer. The independent (meth)acrylonitile-based polymer is, for example, a homopolymer of a poly (meth)acrylonitrle (hereinafter, it may be abbreviated as "PAN"). The homopolymer of PAN is soluble in dimethylformamide (hereinafter, it may be abbreviated as "DMF"), but PVA and graft copolymerized PAN is Insoluble in DMF. Using this difference in solubility, the PAN homopolymer can be separated by an operation such as centrifugation.

Specifically, the graft copolymerization product having a known PAN content is immersed in a predetermined amount of DMF, and the PAN homopolymer is eluted in DMF. Next, the liquid in which it is immersed is separated into a DMF soluble part and a DMF insoluble part by centrifugation.

The graft ratio can be determined by the following formula (1).

$$\text{Graft Ratio} = [c - a \times (100-b) \times 0.01] / [a \times (100-b) \times 0.01] \times 100(\%) \quad (1)$$

In the formula (1), a, b and c are as follows.
a: Amount of graft copolymer-based resin used for the measurement
b: Amount of PAN (% by mass) in the graft copolymer-based resin used for the measurement
c: Amount of DMF insoluble content The graft ratio of the graft copolymer determined by the above formula (1) is preferably 150 to 900% from the viewpoint of improving the covering property to the active material, oxidation resistance, and binding properties.

As described above, the graft copolymer-based resin in the present embodiment may contain, in addition to the graft copolymer, an independent (meth)acrylonitrile-based polymer and a homopolymer of PVA that can be generated when the graft copolymer is produced. The weight average molecular weight of the independent (meth)acrylonitrile-based polymer ((meth)acrylonitrile-based non-grafted polymer) is preferably 30,000 to 300,000, more preferably 80,000 to 280,000, and even more preferably 200,000 to 260,000. From the viewpoint of suppressing the increase in the viscosity due to the independent (meth)acrylonitrile-based polymer to easily produce the slurry for positive electrode slurry, the weight-average molecular weight of the independent (meth)acrylonitrile-based polymer is preferably 300,000 or less, more preferably 280,000 or less, even more preferably 260,000 or less. The weight average molecular weight of the independent (meth)acrylonitrile-based polymer can be determined by GPC (gel permeation chromatography).

The content of PVA in the graft copolymer-based resin is preferably 10 to 40% by mass, more preferably 15 to 25% by mass. When it is 10% by mass or more, the binding property is improved. When it is 40% by mass or less, the oxidation resistance is improved.

Here, the content of PVA in the graft copolymer-based resin means a proportion of a total amount of PVA and the homopolymer of PVA in the graft copolymer-based resin, with respect to a total amount of the graft copolymer, the independent (meth)acrylonitrile-based polymer and the homopolymer of PVA.

The content of the (meth)acrylonitile-based polymer in the graft copolymer-based resin is 60 to 90% by mass, and more preferably 75 to 85% by mass. When the content is 60% by mass or more, the oxidation resistance is improved. When the content is 90% by mass or less, the binding property is improved.

In the present embodiment, the content of the (meth)acrylonitrile-based polymer in the graft copolymer means a proportion of a total amount of the graft-copolymerized (meth)acrylonitrile-based and the independent (meth)acrylonitrile-based polymer, with respect to a total amount of the graft copolymer in terms of mass, the independent (meth)acrylonitrle-based polymer and the homopolymer of PVA.

The composition ratio of the graft copolymer-based resin can be calculated on the basis of the conversion (polymerization rate) of (meth)acrylonitile and the charged amount of each component used for the polymerization, when only (meth)acrylonitrle is used as a monomer for graft copolymerization with PVA. The mass ratio of PAN produced in the copolymerization, that is, the total amount of the PAN grafted to PVA and the independent PAN homopolymer can be calculated on the basis of the polymerization rate of (meth)acrylonitrile and the amount of the charged (meth)acrylonitrile. The mass ratio of PVA and PAN can be calculated on the basis of the ratio between the amount of PAN and the amount of PVA charged.

Specifically, % by amount of PAN in the graft copolymer-based resin can be calculated according to the following formula (2).

$$\text{Amount of PAN in the graft copolymer-based resin} \\ [\% \text{ by mass}] \text{ (mass ratio)} = d \times 0.01 \times e / (f + d \times 0.01 \times e) \times 100(\%) \quad (2)$$

Here, in the above formula (2), d, e and f are as follows.
d: Polymerization rate (%) of (meth)acrylonitrile
e: Amount of (meth)acrylonitrile used for graft copolymerization (charged amount)
f: Amount of PVA used for graft copolymerization (charged amount).

The composition ratio of the graft copolymer-based resin can also be determined by $^1$H-NMR. For example, when a monomer other than (meth)acrylonitrile Is used for graft copolymerization in addition to (meth)acrylonitile, it is difficult to calculate according to the above formula (2), and it can be determined by $^1$H-NMR. The measurement of $^1$H-NMR is performed using, for example, the "ALPHA500" manufactured by JEOL Ltd., under the conditions of measurement solvent dimethyl sulfoxide, measurement cell: 5 mmφ, sample concentration: 50 mg/1 ml, measurement temperature: 30° C.

The production method of the graft copolymer-based resin of the present invention is not particularly limited, but it is preferable that after polymerization of vinyl acetate and saponification to obtain PVA, a monomer mainly composed of (meth)acrylonitrile is graft-copolymerized with PVA.

As a method for polymerizing vinyl acetate to obtain polyvinyl acetate, any known method such as bulk polymerization or solution polymerization can be used.

Examples of a initiator used for the synthesis of polyvinyl acetate include azo initiators such as azobisisobutyronitrile, and organic peroxides such as benzoyl peroxide and bis (4-t-butylcyclohexyl) peroxydicarbonate.

The saponification reaction of polyvinyl acetate can be performed, for example, by a method of saponifying in an organic solvent in the presence of a saponification catalyst.

Examples of the organic solvent include methanol, ethanol, propanol, ethylene glycol, methyl acetate, ethyl acetate, acetone, methyl ethyl ketone, benzene, toluene and the like. One or more of these may be used alone or in combination. Among these, methanol is preferred.

Examples of the saponification catalyst include basic catalysts such as sodium hydroxide, potassium hydroxide and sodium alkoxide, and acidic catalysts such as sulfuric acid and hydrochloric acid. Among these, sodium hydroxide is preferable from the viewpoint of the saponification rate.

Examples of a method for graft copolymerizing a monomer having (meth)acrylonitrile as a main component with polyvinyl alcohol include a solution polymerization method. Examples of the solvent used for the method include dimethyl sulfoxide, N-methylpyrrolidone, and the like.

Examples of an initiator used for graft copolymerization include organic peroxides such as benzoyl peroxide, azo compounds such as azobisisobutyronitrile, potassium peroxodisulfate, ammonium peroxodisulfate, and the like.

The graft copolymer of this embodiment can be used by dissolving in a solvent. Examples of the solvent for dissolving the graft copolymer include dimethyl sulfoxide, N-methylpyrrolidone and the like. The binder composition preferably contains these solvents, and may contain one or more of these solvents.

[Polyvinylidene Fluoride Resin]

In the present embodiment, the polyvinylidene fluoride resin used is not necessarily a homopolymer, and may be a copolymer having a monomer copolymerizable with a vinylidene fluoride monomer. Examples of the polyvinylidene fluoride resin include: a vinylidene fluoride homopolymer copolymers of vinylidene fluoride and fluorine-containing monomers (vinyl fluoride, trifluoroethylene, chlorotrifluoroethylene, tetrafluoroethylene, hexafluoropropylene, fluoroalkyl vinyl ether, and the like); copolymers of vinylidene fluoride and non-fluorinated monomers (ethylene, chloroethylene, methyl (meth)acrylate, monomethyl malate, and the like). Among these, polyvinylidene fluoride (PVDF) which is a homopolymer of vinylidene fluoride is preferable.

In the present embodiment, the upper limit of the molecular weight of the polyvinylidene fluoride resin is not particularly limited, but is preferably 1,000,000 or less from the viewpoint of solubility in a solvent. The lower limit of the molecular weight of the polyvinylidene fluoride resin is not particularly limited, but is preferably 100,000 or more.

In the graft copolymer-based resin used for the positive electrode for the lithium ion secondary battery of the present embodiment, the mass ratio of the graft copolymer-based resin and the polyvinylidene fluoride resin is as follows: graft copolymer-based resin/polyvinylidene fluoride resin=2/8 to 8/2, and more preferably 3/7 to 7/3.

<Positive Electrode>

The positive electrode of the present embodiment includes a slurry for the positive electrode (electrode composition slurry) containing the composition for a positive electrode, a conductive auxiliary agent and, if necessary, a positive electrode active material is applied on a current collector such as an aluminum foil. After the application, the solvent contained in the slurry is removed by heating, and the current collector and the electrode mixture layer are pressed to be close contacted with a roll press or the like.

[Conductive Auxiliary Agent]

The conductive auxiliary agent used in the present embodiment is preferably at least one selected from the group consisting of (i) fibrous carbon, (ii) carbon black, and (iii) a carbon composite in which fibrous carbon and carbon black are interconnected. Examples of the fibrous carbon include vapor growth carbon fiber, carbon nanotube, carbon nanofiber, and the like. Examples of the carbon black include acetylene black, furnace black, Ketjenblack (registered trademark), and the like. These conductive auxiliary agents may be used alone or in combination of two or more. Among these, at least one selected from acetylene black, carbon nanotube, and carbon nanofiber is preferable from the viewpoint of high effect of improving the dispersibility of the conductive auxiliary agent.

[Positive Electrode Active Material]

In this embodiment, a positive electrode active material may be used as needed. The positive electrode active material used in the present embodiment is preferably a positive electrode active material capable of reversibly occluding and releasing cations. The positive electrode active material is preferably a lithium-containing composite oxide or lithium-containing polyanion compound, which contains Mn and has a volume resistivity of $1 \times 10^4$ Ω·cm or more. Examples of the positive electrode active material include $LiCoO_2$, $LiMn_2O_4$, $LiNiO_2$, $LiMPO_4$, $Li_2MSiO_4$, $LiNi_XMn_{(2-X)}O_4$, $L(Co_XNi_YMn_Z)O_2$, $Li(Ni_XCo_YAl_Z)O_2$, $xLi_2MnO_3 \cdot (1-x)LiMO_2$, and the like. X of $LiNi_XMn_{(2-X)}O_4$ satisfies the condition of $0<X<2$. X, Y, and Z of $Li(Co_XNi_YMn_Z)O_2$ or $Li(Ni_XCo_YAl_Z)O_2$ satisfies the condition of $X+Y+Z=1$, $0<X<1$, $0<Y<1$, and $0<Z<1$. X of $xLi_2MnO_3 \cdot (1-x)LiMO_2$ satisfies the condition of $0<X<1$. M of $LiMPO_4$, $Li_2MSiO_4$, or $xLi_2MnO_3 \cdot (1-x)LiMO_2$ is at least one element selected from the group consisting Fe, Co, Ni, and Mn.

Among these positive electrode active materials, it is preferable at least one selected from the group consisting $LiNi_XMn_{(2-X)}O_4$ ($0<X<2$), $Li(Co_XNi_YMn_Z)O_2$ ($0<X<1$, $0<Y<1$, $0<Z<1$, and $X+Y+Z=1$), and $Li(Ni_XCo_YAl_Z)O_2$ ($0<X<1$, $0<Y<1$, $0<Z<1$, and $X+Y+Z=1$).

The content of the composition for positive electrode in the solid content of the slurry for positive electrode is preferably 0.1 to 8.5% by mass, more preferably 0.1 to 5% by mass, and most preferably 0.3 to 3% by mass.

The content of the positive electrode active material in the solid content of the slurry for positive electrode is preferably 40 to 99.5% by mass, more preferably 65 to 99% by mass, and most preferably 80 to 99% by mass.

The content of the conductive auxiliary agent in the solid content of the slurry for positive electrode is preferably 0.1 to 8.5% by mass, more preferably 0.1 to 4.5% by mass, and most preferably 0.4 to 3% by mass.

Here, the solid content of the slurry for positive electrode is the total amount of the composition for positive electrode, the conductive auxiliary agent, and the positive electrode active material used as needed.

<Lithium Ion Secondary Battery>

The lithium ion secondary battery of the present embodiment is manufactured using the above-described positive electrode, preferably the above-described positive electrode, negative electrode, separator, and electrolyte solution (hereinafter, it is also referred to as "electrolyte" or "electrolytic solution").

[Negative Electrode]

Although the negative electrode used for the lithium ion secondary battery of this embodiment is not specifically limited, can be manufactured using the slurry for negative electrode containing a negative electrode active material. This negative electrode can be manufactured using, for example, a negative electrode metal foil and a slurry for negative electrode provided on the metal foil. The slurry for negative electrode preferably includes a negative electrode binder, a negative electrode active material, and the above-described conductive auxiliary agent. The negative electrode binder is not particularly limited, but for example, polyvinylidene fluoride, polytetrafluoroethylene, styrene-butadiene copolymer (such as styrene butadiene rubber), acrylic copolymer, and the like may be used. The negative electrode binder is preferably a fluorine-based resin. The fluorine-based resin is preferably one or more members selected from the group consisting of polyvinylidene fluoride and polytetrafluoroethylene, and more preferably polyvinylidene fluoride.

Examples of the negative electrode active material used for the negative electrode include: carbon materials such as graphite, polyacene, carbon nanotube, and carbon nanofiber; alloy materials of tin and silicon; oxide materials such as tin oxide, silicon oxide, and lithium titanate. One or more of these may be used alone or in combination.

The metal foil for the negative electrode is preferably foil-like copper, and the thickness of the foil is preferably 5 to 30 μm from the viewpoint of workability. The negative electrode can be manufactured using the slurry for negative electrode and the metal foil for negative electrode by the method according to the manufacturing method of the above-mentioned positive electrode.

[Separator]

The separator is not particularly limited as long as it has sufficient strength. Any separator can be used as long as it has sufficient strength, such as an electrically insulating porous film, a net, and a nonwoven fabric. In particular, it is preferable to use a material that has low resistance to ion migration of the electrolytic solution and excellent in solution holding. The material is not particularly limited, and examples thereof include: inorganic fibers or organic fibers such as glass fibers; synthetic resins such as polyethylene, polypropylene, polyester, polytetrafluoroethylene, and polyflon; and layered composites thereof. From the viewpoints of binding properties and safety, it is preferable one or more selected from the group consisting of polyethylene, polypropylene, or layered composites thereof.

[Electrolyte]

As the electrolyte, any known lithium salt can be used. Examples of the electrolyte include $LiClO_4$, $LiBF_4$, $LiBF_6$, $LiPF_6$, $LiCF_3SO_3$, $LiCF_3Co_2$, $LiAsF_6$, $LSbF_6$, $LiB_{10}Cl_{10}$, $LiAlC_4$, $LiCl$, $LiBr$, $LiI$, $LiB(C_2H_5)_4$, $LiCF_3SO_3$, $LiCH_3SO_3$, $LiCF_3SO_3$, $LiC_4F_9SO_3$, $LiN(CF_3SO_2)_2$, $LiN(C_2F_5SO_2)_2$, $LiC(CF_3SO_2)_3$, lithium fatty acid carboxylate, and the like.

[Electrolyte Solution]

The electrolyte solution dissolving the electrolyte is not particularly limited. Examples of the electrolyte solution include: carbonates such as propylene carbonate, ethylene carbonate, dimethyl carbonate, diethyl carbonate and methyl ethyl carbonate; lactones such as γ-butyrolactone; ethers such as trimethoxymethane, 1,2-dimethoxyethane, diethyl ether, 2-ethoxyethane, tetrahydrofuran and 2-methyltetrahydrofuran; sulfoxides such as dimethyl sulfoxide; oxolanes such as 1,3-dioxolane and 4-methyl-1,3-dioxolane; nitrogen-containing compounds such as acetonitrile, nitromethane and N-methyl-2-pyrrolidone; esters such as methyl formate, methyl acetate, ethyl acetate, butyl acetate, methyl propionate, ethyl propionate and phosphoric acid triester inorganic acid esters such as sulfuric acid ester, nitric acid ester and hydrochloric acid ester; amides such as dimethylformamide and dimethylacetamide; glymes such as diglyme, triglyme and tetraglyme; ketones such as acetone, diethyl ketone, methyl ethyl ketone and methyl isobutyl ketone; sulfolanes such as sulfolane; oxazolidinones such as 3-methyl-2-oxazolidinone; sultone such as 1,3-propane sultone, 4-butane sultone and naphtha sultone; and the like. One or more selected from these electrolytic solutions can be used alone or in combination.

Among the above electrolytes and electrolyte solutions, a solution in which $LiPF_6$ is dissolved in carbonates is preferable. The concentration of the electrolyte in the solution varies depending on the electrode and electrolyte used, but is preferably 0.5 to 3 mol/L.

The application of the lithium ion battery of the present embodiment is not particularly limited, but for example in a wide range of fields: portable AV devices such as digital cameras, video cameras, portable audio players, and portable liquid crystal televisions; portable information terminals such as notebook computers, smartphones, and mobile PCs; portable game machines; electric tools; electric bicycles; hybrid cars; electric cars; power storage systems; and the like.

EXAMPLES

<Preparation of PVA>

600 parts by mass of vinyl acetate and 400 parts by mass of methanol are prepared and degassed by bubbling nitrogen gas. Then, 0.3 parts by mass of bis (4-tert-butylcyclohexyl) peroxydicarbonate was added thereto as a polymerization initiator, polymerization was carried out at 60° C. for 4 hours. The solid content concentration of the polymerization solution when the polymerization was stopped was 48% by mass, and the polymerization rate of vinyl acetate determined on the basis of the solid content was 80%. Methanol vapor was blown into the obtained polymerization solution to remove unreacted vinyl acetate, and then diluted with methanol so that the concentration of polyvinyl acetate was 40% by mass.

20 parts by mass of a methanol solution of sodium hydroxide having a concentration of 10% by mass was added to 1,200 parts by mass of the diluted polyvinyl acetate solution, and a saponification reaction was performed at 30° C. for 2 hours.

The solution after saponification was neutralized with acetic acid, filtered and dried at 100° C. for 2 hours to obtain PVA. The obtained PVA had the average polymerization degree of 330 and the saponification degree of 96.3 mol %.

<Polymerization Degree and Saponification Degree>

The average polymerization degree and the saponification degree of PVA were measured by a method according to JIS K 6726.

(Preparation of Graft Copolymer-Based Resin A)

1.65 parts by mass of the obtained PVA was added to 265.1 parts by mass of dimethyl sulfoxide, and dissolved by stirring at 60° C. for 2 hours. 30.3 parts by mass of acrylonitrile and 0.03 parts by mass of ammonium peroxodisulfate dissolved in 3 parts by mass of dimethyl sulfoxide were added thereto at 60° C., and the mixture was stirred at 60° C. to graft-copolymerize them. After 4 hours from the start of the polymerization, the polymerization was stopped by cooling to room temperature. 297 parts by mass of the reaction solution containing the obtained graft copolymer-based resin A was dropped into 2,970 parts by mass of methanol to precipitate the graft copolymer-based resin A. The polymer was separated by filtration and vacuum-dried at room temperature for 2 hours, and further vacuum-dried at 80° C. for 2 hours. The solid content of the graft copolymer-based resin containing the graft copolymer with respect to the charged amount was 8.87 parts by mass, and the polymerization rate of acrylonitrle was 23.8% calculated on the basis of the solid content.

The amount of PVA in the obtained graft copolymer-based resin A is 19% by mass of the total of polymers, the amount of PAN in the obtained graft copolymer-based resin A is 81% by mass of the total of polymers, and the graft ratio was 435%, and the weight average molecular weight of the homopolymer of PAN not bound to the graft copolymer was 256,200. Methods for these measurements will be described in <Composition Ratio> and <Graft Ratio> below.

<Composition Ratio>

The composition ratio of the graft copolymer-based resin A was calculated on the basis of the composition of the conversion of acrylonitrile (polymerization rate) and the charged amount of each component used for the polymerization. The amount of PAN produced in copolymerization (the amount of PAN in the graft copolymer-based resin (% by mass)) is calculated on the basis of the polymerization rate (%) of acrylonitrile, the amount of acrylonitrle used in the graft copolymerization (charge amount), and the amount of PVA used in the graft copolymer (charge amount), according to the above-described formula (2). The "mass ratio" in the table below is a mass ratio in the resin component including the graft copolymer itself, and the PVA homopolymer and PAN homopolymer that are not bonded to the graft copolymer formed in the copolymerization.

<Graft Ratio>

1.00 g of the graft copolymer-based resin A was weighed and added to 50 cc of special grade DMF (manufactured by Kokusan Chemical Co., Ltd.) and stirred at 80° C. for 24 hours. Next, the mixture was centrifuged for 30 minutes at a rotational speed of 10,000 rpm with a centrifuge (model: H2000B, rotor H) manufactured by Kokusan Co., Ltd. After carefully separating the filtrate (DMF soluble component), the pure water insoluble component was vacuum dried at 100° C. for 24 hours, and the graft ratio was calculated according to the above formula (1).

<Weight Average Molecular Weight>

The filtrate at the time of centrifugation (DMF soluble component) was put into 1,000 ml of methanol to obtain a precipitate. The precipitate was vacuum-dried at 80° C. for 24 hours, and the weight average molecular weight in terms of standard polystyrene was measured by GPC. GPC was measured under the following conditions.

Column: two of GPC LF-804, φ8.0×300 mm (manufactured by Showa Denko KK) were connected in series Column Temperature: 40° C.

Solvent 20 mM LiBr/DMF

<Preparation of Graft Copolymer-Based Resin B>

The amount of bis (4-t-butylcyclohexyl) peroxydicarbonate in the preparation of PVA for the graft copolymer-based resin A was changed to 0.15 parts by mass, and polymerized at 60° C. for 5 hours. The polymerization rate was 80%.

After removing the unreacted vinyl acetate in the same manner as the PVA for the graft copolymer-based resin A, it was diluted with methanol so that the concentration of polyvinyl acetate was 30% by mass. 20 parts by mass of a sodium hydroxide methanol solution of 10% by weight was added to 2,000 parts by mass of the polyvinyl acetate solution, and a saponification reaction was carried out at 30° C. for 2.5 hours.

Neutralization, filtration and drying were carried out in the same manner as the graft copolymer resin A to obtain PVA having the average polymerization degree of 1,650 and the saponification degree of 95.5 mol %.

Using the obtained PVA, PAN was polymerized in the same manner as the graft copolymer-based resin A to prepare the graft copolymer-based resin B. The mass ratio of PVA and PAN in the graft copolymer-based resin B was 19/81. The composition ratio was measured in the same manner as the graft copolymer-based resin A. The same manner was applied to the following graft copolymer-based resin C. The graft ratio was 426%, and the weight average molecular weight of the PAN homopolymer was 231,100.

<Preparation of Graft Copolymer-Based Resin C>

The amounts of vinyl acetate and bis (4-t-butylcyclohexyl) peroxydicarbonate as a polymerization initiator and, in the preparation of PVA, were changed to 900 parts by mass and 0.15 parts by mass, and polymerized at 60° C. for 5 hours. The polymerization rate was 70%. It was diluted with methanol so that the concentration of polyvinyl acetate was 30% by mass. 20 parts by mass of a sodium hydroxide methanol solution of 10% by weight was added to 2,000 parts by mass of the polyvinyl acetate solution, and a saponification reaction was carried out at 30° C. for 2.5 hours. Neutralization, filtration and drying were carried out in the same manner as the graft copolymer resin A to obtain PVA having the average polymerization degree of 2,940 and the saponification degree of 94.8 mol %.

Using the obtained PVA, PAN was polymerized in the same manner as the graft copolymer-based resin A to prepare the graft copolymer-based resin C. The mass ratio of PVA and PAN in the graft copolymer-based resin C was 21/79. The same manner was applied to the following graft copolymer-based resin C. The graft ratio was 376%, and the weight average molecular weight of the PAN homopolymer was 253,800.

Table 1 shows the properties of the graft copolymer-based resins used in Examples and Comparative Examples.

TABLE 1

| Graft Copolymer-based Resin | | A | B | C |
| --- | --- | --- | --- | --- |
| Average Degree of Polymerization of PVA | | 330 | 1650 | 2940 |
| Degree of Saponification (mol %) | | 96.3 | 95.5 | 94.8 |
| Mass Ratio (%) | Polyvinyl Alcohol Skeleton | 19 | 19 | 21 |
| | Polyacrylonitrile Skeleton | 81 | 81 | 79 |
| Graft Ratio (%) | | 435 | 426 | 376 |
| Weight Average Molecular Weight of PAN Homopolymer | | 256200 | 231100 | 253800 |

Example 1

(Preparation of Composition Solution for Positive Electrode)

0.25 parts by mass of the obtained graft copolymer-based resin A and 0.25 parts by mass of PVDF (molecular weight 300,000; PVDF homopolymer) were added to 95 parts by mass of N-methyl-2-pyrrolidone (hereinafter, it may be abbreviated as "NMP") and dissolved to obtain a binder solution (composition solution for positive electrodes).

(Preparation of Positive Electrode)

99.0 parts by mass of $LiCoO_2$ (KD20s manufactured by Umicore) as an active material, 0.5 part by mass of Li435 (Denka Black (registered trademark), carbon black manufactured by Denka Company Limited) as a conductive auxiliary agent, 0.5 part by mass of the composition solution for positive electrode (a value in terms of solid content; the value in terms of solid content solid content is the total amount of the graft copolymer-based resin and PVDF) was stirred and mixed to obtain a slurry for positive electrode. The prepared slurry for positive electrode was applied to both sides of an aluminum foil having a thickness of 20 μm by an automatic coating machine so that each coating film has 20 mg/cm$^2$ and was preliminarily dried at 105° C. for 15 minutes. Next, it was pressed with a roll press machine at a linear pressure of 0.2 to 3 ton/cm so that the positive electrode plate has the thickness of 150 μm as the total thickness including the coating films of both sides. Furthermore, the positive electrode plate was cut into a width of 54 mm to produce a strip-shaped positive electrode plate. After ultrasonically welding a current collecting tab made of aluminum to the end of the positive electrode plate, in order to completely remove volatile components such as residual solvent and adsorbed moisture, it was dried at 105° C. for 1 hour to obtain a positive electrode.

(Flexibility Evaluation of Positive Electrode)

The obtained positive electrode was wound around φ1.5 mm round bar, and the flexibility of the positive electrode was evaluated based on whether or not the surface of the positive electrode mixture layer was cracked. The number of cracks and the maximum crack width (maximum crack length) were observed caused by the winding. If no crack is observed when wound, it is evaluated that the flexibility is high.

(Pealing Strength Test of Positive Electrode (Peel Strength))

99.0 parts by mass of $LiCoO_2$ (KD20s manufactured by Umicore) as an active material, 0.5 part by mass of Li435 (Denka Black (registered trademark), carbon black manufactured by Denka Company Limited) as a conductive auxiliary agent, 0.5 part by mass of the composition solution for positive electrode (a value in terms of solid content; the value in terms of solid content solid content is the total amount of the graft copolymer-based resin and PVDF) was stirred and mixed to obtain a slurry for positive electrode. The prepared slurry for positive electrode was applied to one side of an aluminum foil having a thickness of 20 μm by an automatic coating machine so that the coating film has 20 mg/cm$^2$ and was preliminarily dried at 105° C. for 15 minutes. Next, it was pressed with a roll press machine at a linear pressure of 0.2 to 3 ton/cm so that the positive electrode plate has the average thickness of 75 μm. The obtained positive electrode plate was cut into a width of 1.5 cm, and an adhesive tape was attached to the surface of the positive electrode active material of the cut plate, and a stainless steel plate and the tape attached to the positive electrode plate were stuck together with a double-sided tape. Furthermore, another adhesive tape was attached to the aluminum foil of the positive electrode plate to obtain a test piece. The stress was measured when the adhesive tape attached to the aluminum foil was peeled off at a speed of 50 mm/min in the direction of 180° under an atmosphere of 23° C. and 50% relative humidity. The measurement was repeated 5 times to obtain an average value of the stress, which was defined as peel strength.

(Preparation of Negative Electrode)

Pure water (manufactured by Kanto Chemical Co., Inc.) as a solvent, artificial graphite (manufactured by Hitachi Chemical Co., Ltd., "MAG-D") as a negative electrode active material, styrene butadiene rubber (manufactured by Nippon Zeon Co., Ltd., "BM-400B"; hereinafter, it may be referred to "SBR") as a negative electrode binder, and carboxymethyl cellulose (manufactured by Daicel, "D2200"; hereinafter, it may be referred to as "CMC") were prepared. Next, CMC and artificial graphite were weighed and mixed so that the mixture has CMC of 1% by mass in a solid content and artificial graphite of 97% by mass in a solid content, and pure water is added thereto and the mixture was mixed until uniform with a planetary centrifugal vacuum mixer (ARV-310, manufactured by THINKY). SBR was weighed and added to the mixture so that the mixture has SBR of 2% by mass in solid content, and the mixture was mixed until uniform with the planetary centrifugal vacuum mixer (ARV-310, manufactured by THINKY) to obtain a negative electrode slurry for an aqueous battery. Next, the negative electrode slurry for a non-aqueous battery was applied on a copper foil having a thickness of 10 μm (manufactured by UACJ) with an applicator to form a coating film, and the film was allowed to stand in a dryer and preliminarily dried at 60° C. for one hour. Then, the film was pressed with a roll press at a linear pressure of 100 kg/cm so that the thickness of the film including the copper foil was 40 μm. In order to completely remove residual moisture, vacuum drying was performed at 120° C. for 3 hours to obtain the negative electrode.

(Preparation of Lithium Ion Battery)

In a dry room controlled at a dew point of −50° C. or lower, the positive electrode was processed to 40×40 mm and the negative electrode was processed to 44×44 mm. These electrodes were arranged so that the electrode mixture coating surface was opposed at the center. A polyolefin microporous membrane processed to 45×45 mm was disposed therebetween. Next, an aluminum laminate sheet cut and processed into 70×140 mm square was folded in half at the center of the longitudinal direction, and the current collecting tab was placed and sandwiched so that the current collecting tab of the electrode was exposed to the outside of the aluminum laminate sheet. Next, two sides of the aluminum laminate sheet including the side where the current collecting tab was exposed were heat-sealed using a heat sealer. From one side that was not heat-sealed, 2 g of an electrolytic solution (manufactured by Kishida Chemical Co., Ltd.; ethylene carbonate/diethyl carbonate=1/2 (volume ratio)+1M $LiPF_6$ solution; hereinafter, it may be referred to "electrolytic solution") was injected. The positive electrode, the negative electrode, and the polyolefin microporous membrane using the above electrode were sufficiently impregnated with the electrolytic solution. Thereafter, the remaining one side of the aluminum laminate sheet was heated and fused while reducing the pressure inside the battery with a vacuum heat sealer to obtain the lithium ion battery.

The battery performance of the manufactured lithium ion battery was evaluated with the following methods.

(Evaluation of Lithium Ion Battery)

[Discharge Rate Characteristics (Capacity Retention Ratio During 2 C Discharge)]

The manufactured lithium ion battery was charged at a constant current and a constant voltage of limitation of 4.30 V and 0.2 C at 25° C., and then discharged to 3.0 V at a constant current of 0.2 C. Next the discharge current was changed to 0.2 C, 0.5 C, 1 C, and 2 C, and the discharge capacity for each discharge current was measured. In the recovery charge in each measurement, constant current and constant voltage charge of limitation of 4.30 V, 0.2 C was performed. And, the capacity retention ratio (high-rate discharge capacity retention ratio) at 3 C discharge with respect to 0.2 C discharge was calculated. The capacity retention ratio during 2 C discharge of the lithium ion battery of this example was 58%.

[Cycle Characteristics (Discharge Capacity Retention Ratio after Cycle)]

The manufactured lithium on battery was charged with a constant current and a constant voltage of limitation of 4.30 V and 1 C at 25° C., and then discharged to 3.0 V with a constant current of 1 C. Next, the above charge/discharge cycle was repeated 400 cycles, and the discharge capacity was measured. Then, a post-cycle discharge capacity retention ratio (cycle capacity retention ratio) at the time of 400 cycle discharge with respect to 1 cycle discharge was calculated. The post-cycle discharge capacity retention ratio of the lithium ion battery of this example was 88%.

TABLE 2

| | | | Example | | | | | Comparative Example | |
|---|---|---|---|---|---|---|---|---|---|
| | | | 1 | 2 | 3 | 4 | 5 | 1 | 2 |
| Composition of Slurry | Graft Copolymer-based Resin | Kind of Graft Copolymer-based Resin | A | B | C | A | A | — | A |
| | | Amount of Graft Copolymer-based Resin | 0.25 | 0.25 | 0.25 | 0.15 | 0.35 | 0 | 0.5 |
| | | Amount of PVDF | 0.25 | 0.25 | 0.25 | 0.35 | 0.15 | 0.5 | 0 |

TABLE 2-continued

|  |  |  | Example | | | | | Comparative Example | |
|---|---|---|---|---|---|---|---|---|---|
|  |  |  | 1 | 2 | 3 | 4 | 5 | 1 | 2 |
|  | Active Material | LiCoO$_2$ | 99.0 | 99.0 | 99.0 | 99.0 | 99.0 | 99.0 | 99.0 |
|  | Conductive Auxiliary Agent | Acetylene Black | 0.5 | 0.5 | 0.5 | 0.5 | 0.5 | 0.5 | 0.5 |
| Electrode Evaluation | Peel Strength (mN/mm) |  | 2.55 | 2.45 | 2.40 | 2.10 | 2.30 | 0.15 | 2.95 |
|  | Flexibility Evaluation (Observed Cracks) | Number of Cracks | 0 | 0 | 0 | 0 | 0 | 0 | 10 |
|  |  | Max Width of Craks (cm) | 0 | 0 | 0 | 0 | 0 | 0 | 5 |
|  | High-rate Discharge Capacity Retention Ratio (%) |  | 58 | 60 | 58 | 56 | 57 | 14 | 55 |
|  | Cycle Capacity Ratio (%) |  | 88 | 85 | 82 | 80 | 79 | 50 | 82 |

Example 2

An electrode and a lithium ion battery were produced in the same manner as in Example 1 except that the graft copolymer-based resin A in Example 1 was changed to the graft copolymer-based resin B. The results are shown in Table 2.

Example 3

An electrode and a lithium ion battery were prepared in the same manner as in Example 1 except that the graft copolymer-based resin A in Example 1 was changed to the graft copolymer-based resin C. The results are shown in Table 2.

Example 4

An electrode and a lithium ion battery were produced in the same manner as in Example 1 except that the amount of the graft copolymer-based resin in Example 1 was changed to 0.15% by mass and the amount of PVDF was changed to 0.35% by mass. The results are shown in Table 2.

Example 5

An electrode and a lithium ion battery were produced in the same manner as in Example 1 except that the amount of the graft copolymer-based resin in Example 1 was changed to 0.35% by mass and the amount of PVDF was changed to 0.15% by mass. The results are shown in Table 2.

Comparative Example 1

An electrode and a lithium ion battery were produced in the same manner as in Example 1 except that the graft copolymer-based resin A in Example 1 was changed to 0% by mass and the amount of PVDF was changed to 0.50% by mass. The results are shown in Table 2. When an electrode was produced under the conditions of Comparative Example 1, the high rate discharge capacity retention ratio and cycle capacity retention ratio were low.

Comparative Example 2

An electrode and a lithium ion battery were produced in the same manner as in Example 1 except that the graft copolymer-based resin A in Example 1 was changed to 0.5% by mass and the amount of PVDF was changed to 0% by mass. The results are shown in Table 3. When an electrode was produced under the conditions of Comparative Example 2, the result shows low flexibility.

From the results shown in Table 2, the embodiment of the present invention has great flexibility and binding properties of the electrode. The lithium ion secondary battery manufactured using the positive electrode of the embodiment of the present invention has good cycle characteristics and discharge rate characteristics.

In order to increase the energy density of the lithium ion secondary battery, it is necessary to increase the proportion of the active material in the positive electrode and to increase the thickness of the electrode mixture layer. However, when polyvinylidene fluoride widely used as a binder is applied, increasing the active material in the positive electrode can cause a peeling the mixture layer from the current collector due to insufficient adhesive strength. In order to solve this problem, when an electrode was produced using a binder other than polyvinylidene fluoride having high adhesive strength, the flexibility of the electrode can be insufficient. When the electrode mixture layer is thickened, the electrode mixture layer of the electrode can be cracked during the winding process in the electrode production.

In the present embodiments, a composition for a positive electrode (a positive electrode binder composition) in which a polymer obtained by grafting a monomer having (meth) acrylonitrile as a main component to polyvinyl alcohol and a polyvinylidene fluoride resin are used together as a binder may provide an electrode with both the binding property (adhesiveness) and the flexibility.

In the present embodiments, a graft copolymer-based resin and a polyvinylidene fluoride resin are used together as a binder may provide an electrode for the lithium ion secondary battery with high energy density, when the graft copolymer-based resin is a resin in which an average polymerization degree of a polyvinyl alcohol is 300 to 3.000, the polyvinyl alcohol has a saponification degree of 85 to 100 mol %, a content of the polyvinyl alcohol in the graft copolymer-based resin is 10 to 40% by mass, and a content of the (meth)acrylonitrile-based polymer in the graft copolymer-based resin is 60 to 90% by mass.

In the present embodiments, when the mass ratio of the graft copolymer resin and the polyvinylidene fluoride resin is set to the ratio suitable for use of a binder for the lithium ion secondary battery, high adhesive strength due to the binder can be achieved. As a result, the proportion of the active material can be increased and the electrode having electrode flexibility can be provided.

In the present embodiments, a positive electrode for a lithium ion secondary battery having a high energy density can be provided due to increasing the proportion of the active material in the positive electrode, dispersing small particle size conductive material, increasing a coating thickness of the electrode mixture layer, and having flexibility of the positive electrode. In the present embodiments, a high energy density electrode that achieves both thick coating of the electrode mixture layer and flexibility of the electrode can be provided.

The present embodiments can contribute to provide a positive electrode for a lithium ion secondary battery, and a positive electrode and a lithium ion secondary battery using the positive electrode.

The invention claimed is:

1. A composition for a positive electrode comprising:
a graft copolymer-based resin;
a polyvinylidene fluoride-based resin, wherein
the graft copolymer-based resin includes a graft copolymer in which a monomer, and having a (meth)acrylonitrile as a main component, is graft-copolymerized with a polyvinyl alcohol;
a graft ratio of the graft copolymer is a graft ratio lying in a range of 300% to 570%;
a content of the polyvinyl alcohol in the graft copolymer-based resin lying in a range of 15% by mass to 25% by mass; and
a content of the (meth)acrylonitrile-based polymer in the waft copolymer-based resin lying in a range of 75% by mass to 85% by mass.

2. The composition of claim 1, wherein the composition has a mass ratio of the graft copolymer-based resin and the polyvinylidene fluoride resin, which is: graft copolymer-based resin 1 polyvinylidene fluoride-based resin=2/8 to 8/2.

3. The composition of claim 1, wherein
the graft copolymer-based resin further includes at least one of a (meth)acrylonitrile-based non-grafted polymer and a polyvinyl alcohol homopolymer comprising a non-grafted polymer,
the (meth)acrylonitrile-based non-grafted polymer has a weight average molecular weight of 30,000 to 300,000,
an average polymerization degree of the polyvinyl alcohol is 300 to 3,000, and
the polyvinyl alcohol has a saponification degree of 85 to 100 mol %.

4. A slurry for a positive electrode comprising the composition of claim 1 and a conductive auxiliary agent.

5. The slurry of claim 4, wherein the conductive auxiliary agent is at least one selected from the group consisting of (i) fibrous carbon, (ii) carbon black, and (iii) a carbon composite in which fibrous carbon and carbon black are interconnected.

6. A positive electrode comprising a metal foil and a coating film of the slurry of claim 4 formed on the metal foil.

7. A lithium ion secondary battery comprising the positive electrode of claim 6.

8. A slurry for a positive electrode comprising the composition of claim 1, a positive electrode active material and a conductive auxiliary agent.

9. The slurry of claim 8, wherein the positive electrode active material is at least one member selected from the group consisting of: $LiNi_XMn_{(2-X)}O_4$ ($0<X<2$); $Li(Co_XNi_YMn_Z)O_2$ ($0<X<1$, $0<Y<1$, $0<Z<1$, and $X+Y+Z=1$); and $Li(Ni_XCo_YAl_Z)O_2$ ($0<X<1$, $0<Y<1$, $0<Z<1$, and $X+Y+Z=1$).

10. The slurry of claim 8, wherein a content of the positive electrode active material is 40 to 99.5% by mass in a solid content of the slurry.

11. A method for manufacturing the composition of claim 1, wherein the graft copolymer is produced by graft copolymerizing a (meth)acrylonitrile with the polyvinyl alcohol.

* * * * *